US009098864B2

(12) United States Patent
Graziosi et al.

(10) Patent No.: US 9,098,864 B2
(45) Date of Patent: Aug. 4, 2015

(54) GAME ASSET LINKED TO OPERATIONS PERFORMED OUTSIDE THE GAME

(71) Applicants: Mateo Graziosi, San Francisco, CA (US); Rishi Sachdeva, San Francisco, CA (US); Fabio Santini, Mountain View, CA (US)

(72) Inventors: Mateo Graziosi, San Francisco, CA (US); Rishi Sachdeva, San Francisco, CA (US); Fabio Santini, Mountain View, CA (US)

(73) Assignee: Zynga Inc., San Francisco, CA (US)

( * ) Notice: Subject to any disclaimer, the term of this patent is extended or adjusted under 35 U.S.C. 154(b) by 52 days.

(21) Appl. No.: 13/736,889

(22) Filed: Jan. 8, 2013

(65) Prior Publication Data
US 2014/0194197 A1 Jul. 10, 2014

(51) Int. Cl.
*A63F 9/24* (2006.01)
*G06Q 30/02* (2012.01)
*A63F 13/61* (2014.01)
*G06Q 30/06* (2012.01)
*G06Q 30/00* (2012.01)
*A63F 13/69* (2014.01)
*A63F 13/822* (2014.01)
*A63F 13/792* (2014.01)

(52) U.S. Cl.
CPC ............ *G06Q 30/0209* (2013.01); *A63F 13/61* (2014.09); *A63F 13/69* (2014.09); *A63F 13/792* (2014.09); *A63F 13/822* (2014.09); *G06Q 30/00* (2013.01); *G06Q 30/02* (2013.01); *G06Q 30/0217* (2013.01); *G06Q 30/0277* (2013.01); *G06Q 30/0613* (2013.01); *A63F 2300/407* (2013.01); *A63F 2300/554* (2013.01); *A63F 2300/556* (2013.01); *A63F 2300/57* (2013.01); *A63F 2300/65* (2013.01); *A63F 2300/8094* (2013.01); *G06Q 30/0207* (2013.01)

(58) Field of Classification Search
CPC .............. A63F 13/12; A63F 2300/407; A63F 2300/556; A63F 2300/554; A63F 2300/57; A63F 2300/8094; A63F 2300/535; A63F 2300/5546; A63F 13/61; A63F 2300/65; G06Q 30/02; G06Q 30/0207; G06Q 30/0209; G06Q 30/0217; G06Q 30/0613; G06Q 30/0277
USPC ................................. 463/29, 40–42
See application file for complete search history.

(56) References Cited

U.S. PATENT DOCUMENTS 7,465,212 B2 * 12/2008 Ganz ............................ 446/175
8,292,743 B1 * 10/2012 Etter et al. ...................... 463/42

(Continued)

OTHER PUBLICATIONS

"FarmVille Sponsorship FAQs", Dec. 2011, Discover.com, <https://www.discover.com/credit-cards/help-center/faqs/farmville.html?vcmpgn=farmville>.*

(Continued)

*Primary Examiner* — Justin Myhr
(74) *Attorney, Agent, or Firm* — Martine Penilla Group, LLP

(57) ABSTRACT

Methods, systems, and computer programs are presented for executing game operations. One method includes an operation for receiving a request from a player to acquire a first game asset to be utilized in the game, the first game asset being associated with a token usable in the real world outside the game. After assigning the first game asset to the player in the game, the player is rewarded in the game with a second asset in response to the request. Further, the method includes an operation for detecting a commercial operation executed outside the game by the player with the token, and the player is rewarded in the game with a third asset in response to the detecting.

19 Claims, 11 Drawing Sheets

(56) References Cited

U.S. PATENT DOCUMENTS

| | | | | |
|---|---|---|---|---|
| 2002/0128057 | A1* | 9/2002 | Walker et al. | 463/20 |
| 2004/0015608 | A1* | 1/2004 | Ellis et al. | 709/246 |
| 2005/0247798 | A1* | 11/2005 | Graves et al. | 235/493 |
| 2007/0197297 | A1* | 8/2007 | Witchey | 463/42 |
| 2010/0151940 | A1* | 6/2010 | Borge | 463/29 |
| 2011/0263324 | A1* | 10/2011 | Ganetakos et al. | 463/31 |
| 2011/0312423 | A1* | 12/2011 | Mosites et al. | 463/42 |
| 2012/0289330 | A1* | 11/2012 | Leydon et al. | 463/31 |

OTHER PUBLICATIONS

Brandy Shaul, "FarmVille Discover Card Goals: Everything you need to know", Dec. 1, 2011, Blog.games, <http://blog.games.com/2011/12/01/farmville-discover-card-goals/>.*

"Century 21 Buys Real Estate in NGMOCO'S We City",Apr. 2011, appssavy, <http://www.appssavvy.com/century21/>.*

Chris Marlowe, "Capital One Opens CityVille Branch",Sep. 20, 2011,dmwmedia,<http://www.dmwmedia.com/news/2011/09/20/capital-one-opens-cityville-branch>.*

Brandy Shaul, "FarmVille: Discover Cashback Bonus Castle available now", Dec. 5, 2011,blog.games,<http://blog.games.com/2011/12/05/farmville-discover-cashback-bonus-castle/>.*

"How can I get City Cash?" Mar. 27, 2011,Zynga forums, <http://www.zyngaplayerforums.com/archive/index.php/t-971353.html>.*

* cited by examiner

Fig. 5A

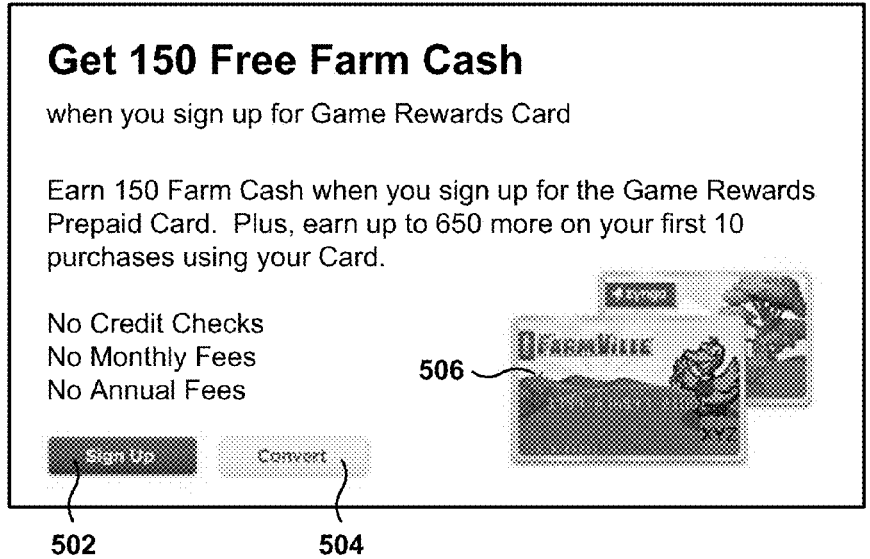

Get 150 Free Farm Cash
when you sign up for Game Rewards Card

Earn 150 Farm Cash when you sign up for the Game Rewards Prepaid Card. Plus, earn up to 650 more on your first 10 purchases using your Card.

No Credit Checks
No Monthly Fees
No Annual Fees

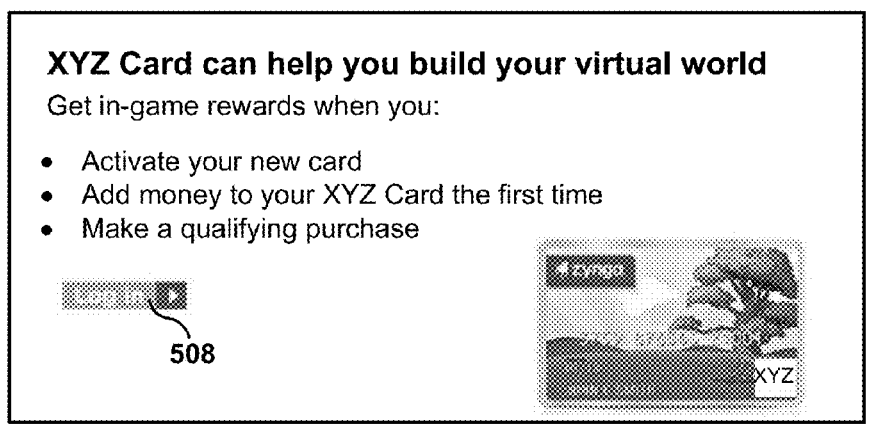

XYZ Card can help you build your virtual world
Get in-game rewards when you:

- Activate your new card
- Add money to your XYZ Card the first time
- Make a qualifying purchase

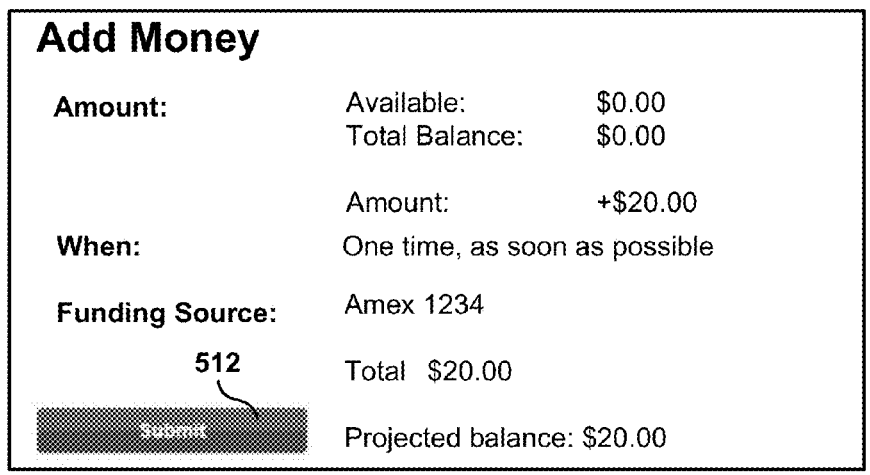

Add Money

| Amount: | Available: | $0.00 |
| | Total Balance: | $0.00 |
| | Amount: | +$20.00 |
| When: | One time, as soon as possible | |
| Funding Source: | Amex 1234 | |
| 512 | Total $20.00 | |
| | Projected balance: $20.00 | |

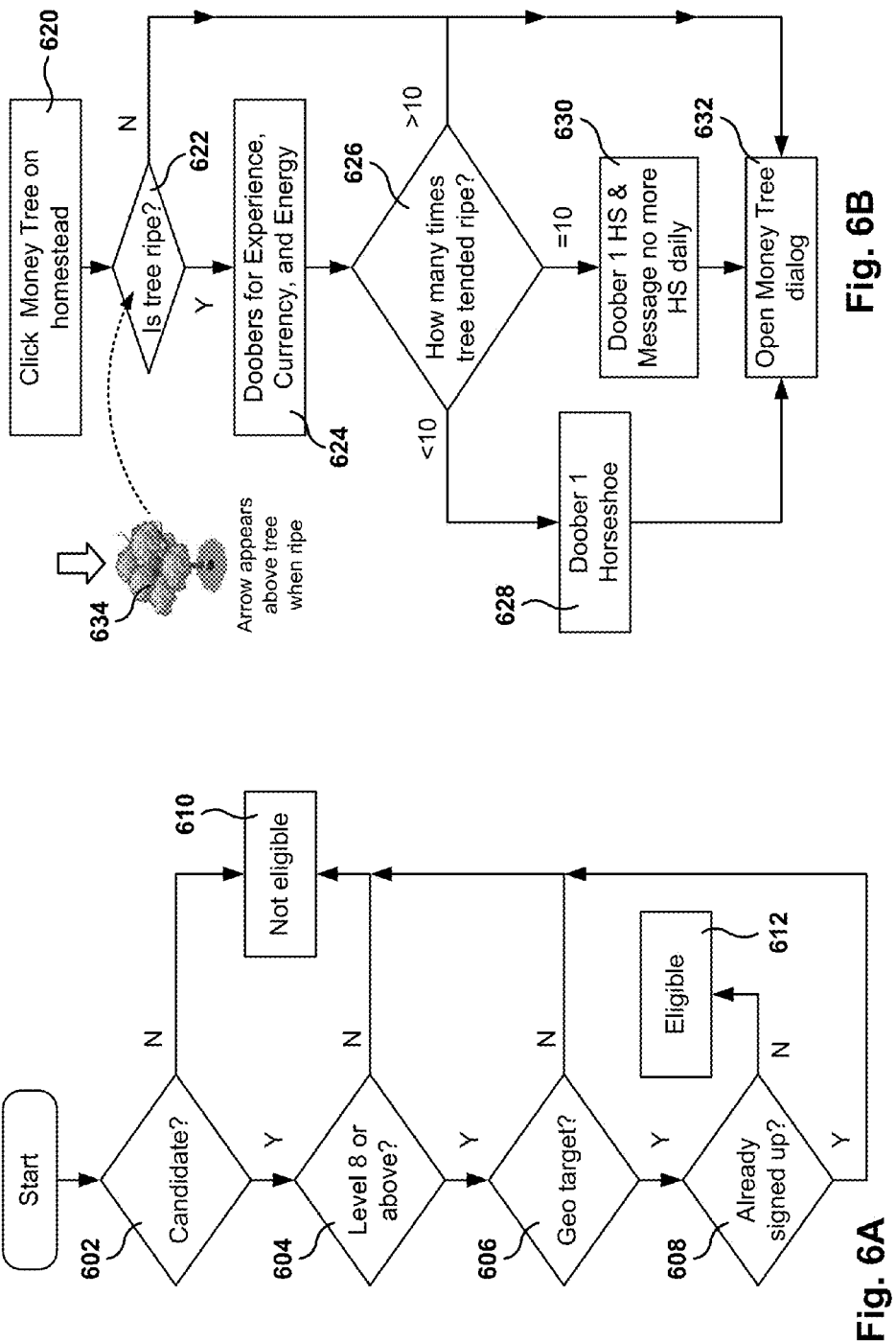

Horseshoe Rewards

| Action | HS Incentive | # Claims | HS Total |
|---|---|---|---|
| Place tree and harvest | 1 (24hr drip) | 10 | 10 |
| Register | 300 | 1 | 300 |
| Add money for the first time | 200 | 1 | 200 |
| Activate your card | 30 | 1 | 30 |
| First 10 purchases made | each 100 | 10 | 1,000 |
| | | TOTAL | 1,540 |

Fig. 7A

Tending Rewards

| Last Completed Step | Money TreeState | each Money Tree Tend Incentives (every 24 hours) | |
|---|---|---|---|
| Place | 1 | 50 XP | 100 Coins | Snack (5 Energy) |
| Register | 2 | 250 XP | 200 Coins | Breakfast (10 Energy) |
| Activate your card | 3 | 450 XP | 500 Coins | Lunch (15 Energy) |
| First purchase made | 4 | 750 XP | 800 Coins | Dinner (30 Energy) |

Fig. 7B

GAME ASSET LINKED TO OPERATIONS PERFORMED OUTSIDE THE GAME

BACKGROUND

1. Field of the Invention

The present embodiments relate to methods for improving game interactions, and more particularly, methods, systems, and computer programs for game assets that are linked to real-life activities.

2. Description of the Related Art

Online games that allow players to interact with other players have become popular. Online game operators aim at continue improving online games to keep players interested in the game, because increased playing times often means higher game revenues.

Some games provide challenges to players, where the challenges entail the completion of one or more tasks within the game. Each player must perform the required tasks to complete the challenges. As the player completes each challenge, the player receives rewards and new challenges are made available to continue the game. Sometimes, players wish to accelerate the completion of tasks, so players spend virtual currency, also referred to as in-game currency, to skip over some tasks. Because of this, game virtual currency is a valuable asset for players.

Sometimes game operators include advertising in the game. For example, an advertisement may be placed on a billboard of a city that the player is building. But these displays have limited functionality and do not create substantial increase in game enjoyment. In order to keep players engaged in the game, a system is desired that would enable game players to receive incentives in the game to play longer.

It is in this context that embodiments arise.

SUMMARY

Methods, devices, systems, and computer programs are presented for executing an online game. It should be appreciated that the present embodiments can be implemented in numerous ways, such as a method, an apparatus, a system, a device, or a computer program on a computer readable medium. Several embodiments are described below.

In one embodiment, a method for executing game operations is provided. The method includes an operation for receiving a request from a player to acquire a first game asset to be utilized in the game. The first game asset is associated with a token usable in the real world outside the game. The first game asset is assigned to the player in the game, and the player is rewarded in the game with a second asset in response to the request. Further, the method includes an operation for detecting a commercial operation executed outside the game by the player with the token. In addition, the player is rewarded in the game with a third asset in response to the detecting. In one embodiment, the operations of the method are executed by a processor.

In another embodiment, a method for executing game operations is provided. The method includes an operation for receiving a request from a player to acquire a first game asset to be utilized in the game. The first game asset is associated with a token usable in a real world outside the game, and the first asset includes growth stages associated with a plurality of commercial operations executed in the real world with the token. Further, the method includes operations for assigning the first game asset to the player in the game, and for sending a first electronic message to notify a commercial company that the first game asset has been assigned to the player. A first commercial operation, executed outside the game by the player with the token, is detected, and the first asset is evolved from a first growth stage to a second stage in response to detecting the first commercial operation. Further, the method includes another operation for rewarding the player in the game with a second asset in response to the evolving. In one embodiment, the operations of the method are executed by a processor.

In yet another embodiment, a computer program embedded in a non-transitory computer-readable storage medium, when executed by one or more processors, for executing game operations, is presented. The computer program includes program instructions for receiving a request from a player to acquire a first game asset to be utilized in the game. The first game asset is associated with a token usable in a real world outside the game. The computer program further includes program instructions for assigning the first game asset to the player in the game and rewarding the player in the game with a second asset in response to the request. Included also are program instructions for detecting a commercial operation executed outside the game by the player with the token. Additionally, the computer program includes program instructions for rewarding the player in the game with a third asset in response to the detecting.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIGS. 5A-5C illustrate embodiments for interfaces related to prepaid-card management operations provided outside the game.

FIGS. 6A-6B are flow charts illustrating algorithms for executing operations associated with the money tree in the game, according to some embodiments.

FIGS. 7A-7B are tables illustrating the rewards associated with the money tree, according to some embodiments.

DETAILED DESCRIPTION

The following embodiments describe methods, computer programs, and apparatus for linking a game asset with a token that may be used in the real world. It will be apparent, that the present embodiments may be practiced without some or all of these specific details. In other instances, well known process operations have not been described in detail in order not to unnecessarily obscure the present embodiments.

Figure 1:
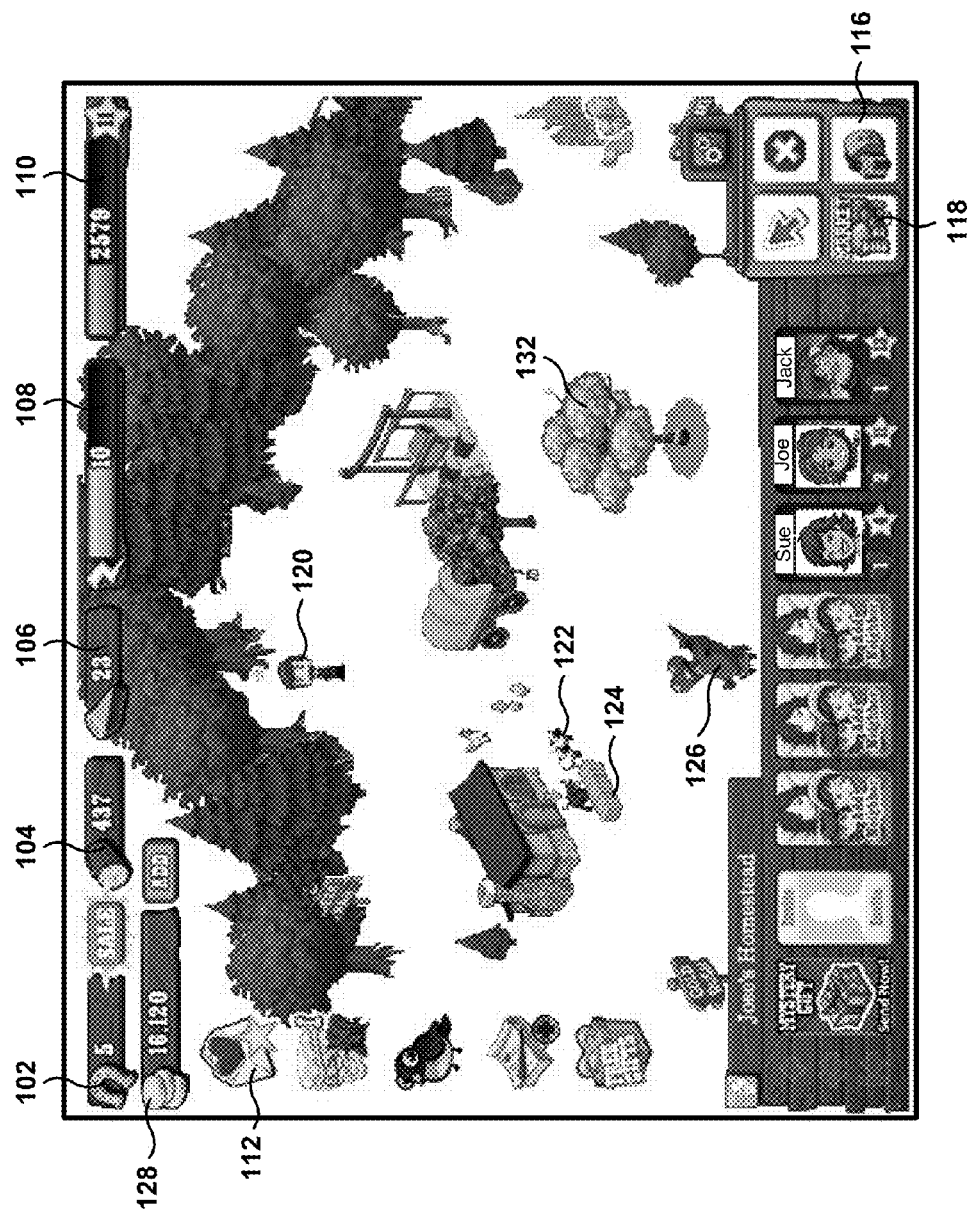
FIG. 1 shows an interface for playing an online game, according to one embodiment.

FIG. 1 shows an interface for playing an online game, according to one embodiment. The embodiment of FIG. 1 shows a screen capture of the game board for the game Pioneer Trail, provided by Zynga Inc., the assignee of the present application. The principles presented herein may be applied to other online games, as well as to games that are not played online. In Pioneer Trail, each player has her own game board, also referred to as a homestead, home board, etc., where each player performs game-relate activities. In addition, a player may visit the game board of other players, to perform viral interactions in the game boards of the other players.

The Pioneer Trail is a simulation, role-playing video game available for play on social networking sites. The player plays the role of a pioneer of the American old west and utilizes an avatar which resembles a pioneer. The player may complete collections which may be traded for coins, experience points (XP), decorations, livestock, trees, craftable items, energy and horseshoes (rare money that can be bought with real money). The player may also finish goals which include tasks such as gathering money, buying energy, clearing land, chopping down trees, raising livestock and trees, creating items such as beds, furniture, and clobbering unwanted pests like bears, snakes, foxes and groundhogs. Eventually the player may acquire a spouse and have children.

Other tasks include collecting from buildings, building inns, wagons, general stores, cabins, schools, chicken coops, barns, trading posts, barber shops, churches, and sawmills as well as seeding, growing and harvesting crops. Coins enable the player to purchase decorations, buildings, crops, trees and animals. Horseshoes, which can be earned in-game or purchased through real-world cash or credit, allow the player to buy mules and horses, paint buckets, hand drills, nails, bricks, hammers, etc. These items are essential for completing certain goals. Friends may also "gift" some items to the player, which is referred to herein as a viral interaction.

Crops may be planted and must be harvested before they wither, and the crops with longer maturation times provide larger payoffs. Harvesting may trigger encounters with ground hogs, which must be "clobbered" to avoid using extra energy within their area of influence. Clobbering pests and harvesting crops yield coins, XP, and food. Food can be used to get energy, which is necessary to perform some actions in the game. Energy can be purchased in exchange for food or horseshoes. When the player runs out of energy, the player must either purchase more energy with food or horseshoes, or wait for more energy to build up over time.

Animals may be purchased and harvested routinely for resources, or sold outright for a large one-time reward. In one embodiment, the animals start out as juveniles and must be fed several times to grow into adults. Players can also plant fruit trees, such as cherry, apple, pear, peach, apricot, etc., and their fruits may be collected when the trees reach maturity.

The game shown in FIG. 1 includes avatar 120, which can be manipulated by the player, such as by clicking the mouse around the play area. For example, if the mouse is clicked somewhere far away from the avatar, the avatar is moved to the faraway place, unless the mouse is clicked on some other game object that causes an in-game action (e.g., if the mouse is clicked on an animal, the avatar feeds the animal).

As the player advances in the game, the player acquires assets, which can take multiple forms. In one embodiment, assets include first virtual currency asset 102 (referred to as horseshoes), second virtual currency 128, wood asset 104, food asset 106, energy asset 108, sheep asset 122, haystack asset 124, dancing bear asset 126, badges, badge collections, temporally tiered levels, bonuses, promotions, penalties, digital content (e.g., image files, icons, audio files, video files), gifts, honor title, rewards, invitation permissions, avatars, rally points, diaries, footprints, trophies, competitions, engagement modes, user difficulty modes (e.g., novice, intermediate, expert), stars, medals, gems, pets, exploration quests, etc. Each asset can be used for one or more purposes. For example, first virtual currency 102 can be used during the game to make progress, also referred to herein as advancement. The first virtual currency 102 can be used to acquire assets (e.g., animals or crops), to remove an obstacle in the game (e.g., enabling progress that would otherwise be blocked), or to complete a task (e.g., finish decorating a house).

In one embodiment, the online game includes quests 112, which may also be referred to as missions, goals, challenges, etc. Each quest identifies one or more tasks that the player must complete before the quest is considered satisfied or finished. For example, a quest may require three tasks: chopping down a tree, feeding an animal, and planting an apple tree. Upon completion of the quest, the player is rewarded in some fashion, such as by getting a new asset, increasing the amount of energy, getting more virtual currency, etc. As the player completes tasks and quests, the game score 110 is increased, and as the game score increases the experience level may also increase.

Clicking on inventory icon 116 causes the online game to display a list of all the items or assets owned by the player. In addition, clicking on marketplace icon 118 takes the player to a virtual marketplace where assets can be acquired. As described above, assets can be from within different categories such as crops, trees, animals, buildings, decorations, energy, special items, weapons, etc. Each category includes a plurality of assets within the category. For example, the animal category includes ducks, chickens, goats, sheep, pigs, etc. Some of the items within a category can be freely acquired by the player, while purchasing of some items can be blocked until certain game condition is met, such as reaching some score, finishing a quest, purchasing the ability to unblock the blocked item, etc.

In one embodiment, the online game is an online social game, which leverages social relationships between the player and other online game players socially linked to the player. For example, the player may add a neighbor to the game by inviting a friend from a social networking site. There are several online social networks run and maintained by various companies, and any one of these companies can provide access to social graph data. Once a friend accepts being a neighbor, a social relationship is established in the game where the game played by the player and the game played by the neighbor can interact with each other. For example, the player may visit the home of the neighbor and perform some game activities therein, and will be rewarded for doing so. Some of the quests in the game may include social activities that promote the interaction between players. For example, one quest may include planting tomatoes in the neighbor's farm. Therefore, the social interaction can provide advancement for the player and for the neighbor.

Embodiments presented herein allow a player to place a value asset 132 in the player's game board. As used herein, a value asset is a game asset that is associated with a token usable in the real world outside the game. In one embodiment, the token is selected from a group consisting of a prepaid card, a credit card, an automated teller machine (ATM) card, a store card, a membership card, or a gift card. For description purposes, a prepaid card is used herein to describe embodiments, but the principles presented may be applied to any other token that may be used in the real world to buy or sell goods or services, or to transfer money. In the embodiment illustrated in FIG. 1, a player has placed a value asset 132, which is referred to herein as a money tree, in the game board. The value asset 132 is associated with a token, which is a prepaid card in one embodiment.

It is noted that the embodiments illustrated in FIG. 1 are exemplary. Other embodiments may utilize different value assets, tokens, quests, social interactions, etc. The embodiments illustrated in FIG. 1 should therefore not be interpreted to be exclusive or limiting, but rather exemplary or illustrative.

Figure 2A:
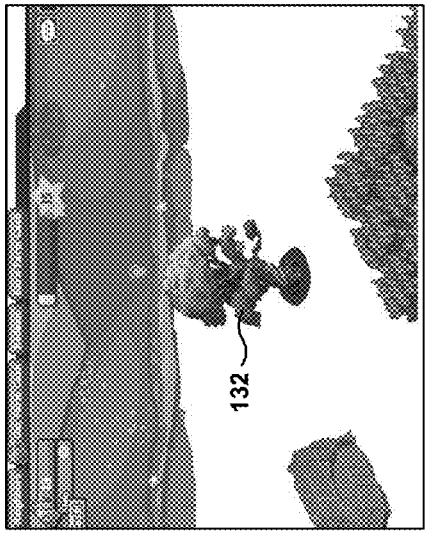
FIGS. 2A-2D illustrate interfaces for placing the value asset in the game, according to some embodiments.

FIGS. 2A-2D illustrate interfaces for placing the value asset in the game, according to some embodiments. FIG. 2A is a message presented to the player to suggest adding the value asset to the game. In one embodiment, the message is presented while the avatar of the player is in the homestead, but the message can be presented anywhere else during game play. For example, the player may see other value asset sponsoring messages while accessing the inventory application, or the market, or when the player runs out of energy, etc.

The promotional message in FIG. 2A entices the user with 300 free virtual currency (e.g., horseshoes) when the user signs up for a prepaid card. An image of the prepaid card is presented to the user, and an option button (e.g., "Plant the money tree!") is provided to allow the user to start the game operation for installing the value asset in the game. In addition, a second message lets the user know of other benefits associated with the value asset, such as exclusive bonus levels, a daily coin bonus, and more horseshoe rewards.

The embodiments described herein refer to a prepaid card as the token, but other types of digital wallets are also possible. In general, a digital wallet (also known as an e-wallet) allows users to make electronic commerce transactions. A digital wallet has both a software and an information component. The software provides security and encryption for the personal information and for the actual transaction. A server-side digital wallet, also known as a thin wallet, is one that an organization creates for a user and maintains on its servers. The information component includes user-inputted information. This information consists of name, shipping address, billing address, payment methods (including credit card numbers, expiration dates, and security numbers), and other information.

In one embodiment, the value asset is representative of a financial product, and is associated with in-game rewards. Some of the embodiments described herein present a "money tree" as the value asset, but many other types of assets may also be used in the game as value assets. In one embodiment, the value asset is selected from a group consisting of a tree, a plant, a vehicle, a car, an airplane, a ship, a weapon, a gun, a rifle, a building, a castle, a decoration, a fountain, an avatar, etc. In another embodiment, the reward for installing the value asset is selected from a group consisting of a game currency, game energy, or a food item.

Figure 2B:
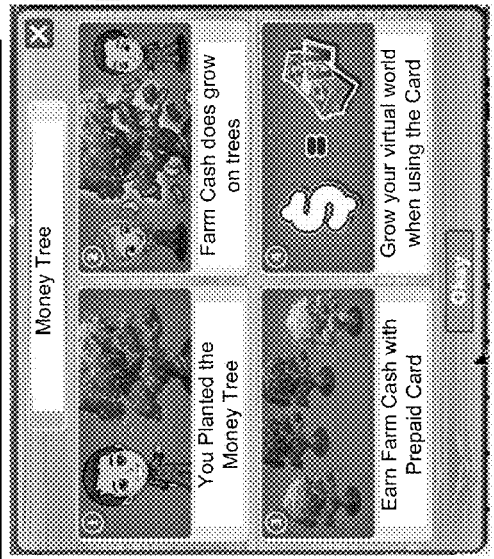

If the user chooses the option to install or accept the value asset, the user then proceeds to place the value asset in the game. The user may place the value asset in the game board, add it to inventory, add it to a storage area, etc. FIG. 2B displays a value asset 132 (e.g., money tree) after the player has placed the money tree in the player's homestead.

Figure 2C:

FIG. 2C shows an embodiment of a message presented to the user after the user installs, or adds, the value asset. A box 202 is presented to the user showing some of the operations associated with the value asset, which are also associated with the token linked to the value asset. In one embodiment, there is a progression associated with the prepaid card. The progression includes: placing (e.g. installing) the value asset in the game, signing up for the prepaid card, activating the prepaid card, and spending money with the prepaid card. The box 202 describing the different operations is referred to herein as a progression map or a progression curve. The interface shown in FIG. 2C is referred to as a progression dialogue box.

A connection is established in the game between the value asset and the prepaid card. The visibility of the asset in the game (e.g., the icon associated with the value asset) reminds players that there is an ongoing program associated with the value asset, including the ability to gain additional rewards. The user is incentivized to place the value asset, not only because it is an appealing asset within the game, but also because the value asset is associated with an external token in real life, that when used may result in game rewards. The use of the prepaid card, which is linked to the game, for operations in the real world increases the engagement value between the player and the game. By using a prepaid card with the game's logo, in one embodiment, players tend to increase the degree of connection with the game, resulting in bigger engagements, higher affinity, and increased playing times.

In addition, if the player clicks or places the mouse over the value asset, additional information regarding the value asset is provided to the user. The user receives incentives at each stage of the progression map to motivate the user to continue through the different stages.

Figure 2D:
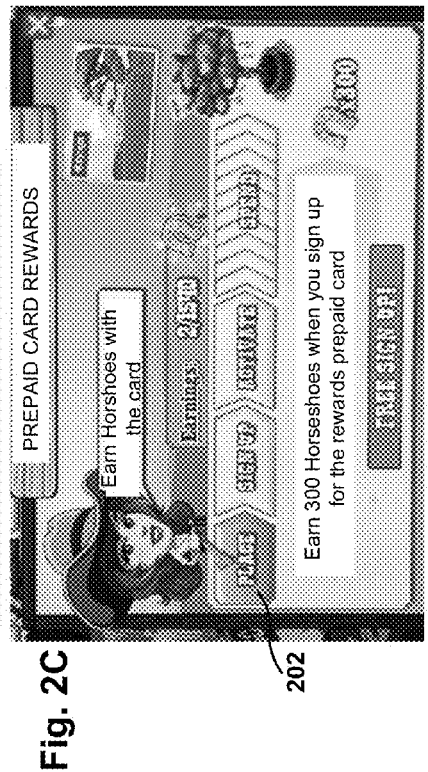

FIG. 2D illustrates one embodiment of an informational message provided to the player after installing the value asset. It is noted, that FIG. 2D is associated with a different game (e.g., Farmville) than the embodiment shown in FIG. 2C (e.g., FrontierVille). For example, the embodiment of FIG. 2-D provides the following messages:

1. "You planted the money tree" (this message is presented after installing the money tree).
2. "Farm cash does grow on trees" (rewards will be given by the money tree).
3. "Earn Farm cash with prepaid card" (the money tree is linked to a prepaid card).
4. "Grow your virtual world when using the card" (the player will get in-game rewards when the player uses the prepaid card in the real world).

It is noted that the embodiments illustrated in FIG. 2A-2D are exemplary. Other embodiments may utilize different progression maps with more or less stages, provide different incentives, different messages, different value assets, different tokens, etc. The embodiments illustrated in FIG. 2C should therefore not be interpreted to be exclusive or limiting, but rather exemplary or illustrative.

Figure 3B:
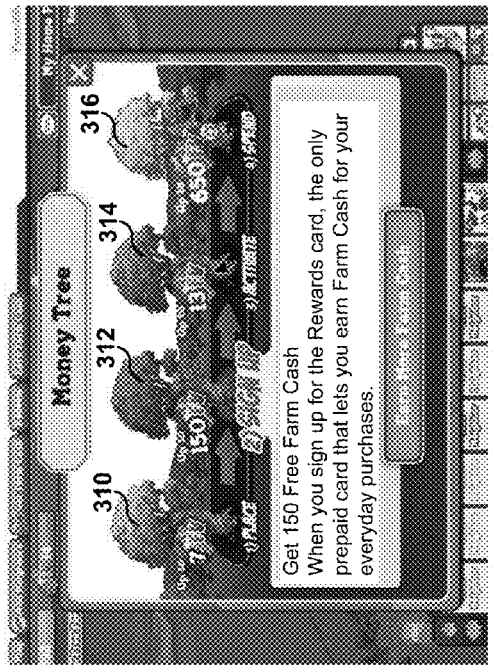
FIGS. 3A-3E illustrate interfaces related to the evolution of the money tree, according to some embodiments.
Figure 3D:
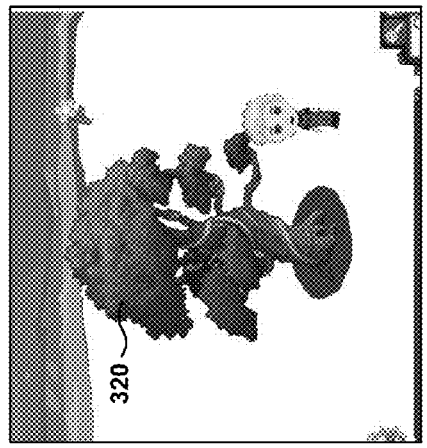
Figure 3A:
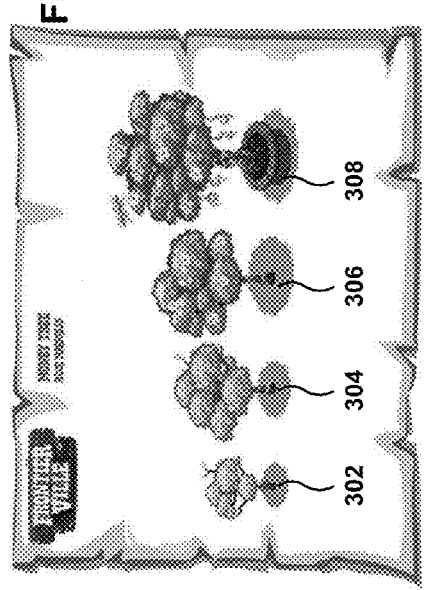

FIGS. 3A-3E illustrate interfaces related to the evolution of the money tree, according to some embodiments. In one embodiment, the in-game icon associated with the value asset changes for each of the different stages of the progression map. FIG. 3A illustrates the evolution of the money tree, according to one embodiment. When the user places the money tree, icon 302 is associated with the value asset in the homestead of the player's board. As the user makes progress, the icon evolves to present a better (e.g., more beautiful, bigger) icon. For example, after the player signs up for the prepaid card, icon 302 is replaced with icon 304, which is bigger and has more flowers. After the player activates the card, icon 306 replaces icon 304, and after the player makes the first purchase with the prepaid card, icon 308 replaces icon 306. Therefore, the objective set for the player is to get the big beautiful tree with icon 308. In one embodiment, one or more of the icons may be animated (e.g., with butterflies flying around, branches moving in the wind, etc.) to increase the appeal value.

In one embodiment, the tree may also be harvested. The tree may be harvested a predetermined number of times or periodically. For example, after the tree is harvested the tree is ready to be harvested again after a period of time (e.g., a day, a week, etc.). Further, as the player uses the prepaid card in stores, the tree may add additional rewards.

FIG. 3B illustrates another embodiment for the progression of the value asset. In this embodiment, the icon associated with each stage changes color as the player progresses in the evolution of the value asset. For example, icon 310 is a blue tree obtained after the player places the value asset, icon 312 is a green tree obtained after the player signs up for the prepaid card, icon 314 is a purple tree obtained after the player activates the prepaid card, and icon 316 is a gold-color tree obtained after the player spends with the prepaid card.

After the player places the value asset, the player is invited to sign up for the card. In one embodiment, the player is given a web link to access a website from a financial institution in order to sign up. More details with reference to sign up for the card and other interfaces with the financial institution are given below with reference to FIGS. 5A-5C.

After the player signs up with the financial institution, the financial institution notifies the game provider, and the player receives the credit for advancement in the progression map. In one embodiment, after signing up for the prepaid card, the player receives the prepaid card in the mail. In order to use the card, the player must first activate the card, such as by going to a website to activate the card or by placing a phone call with the financial institution.

Figure 3C:
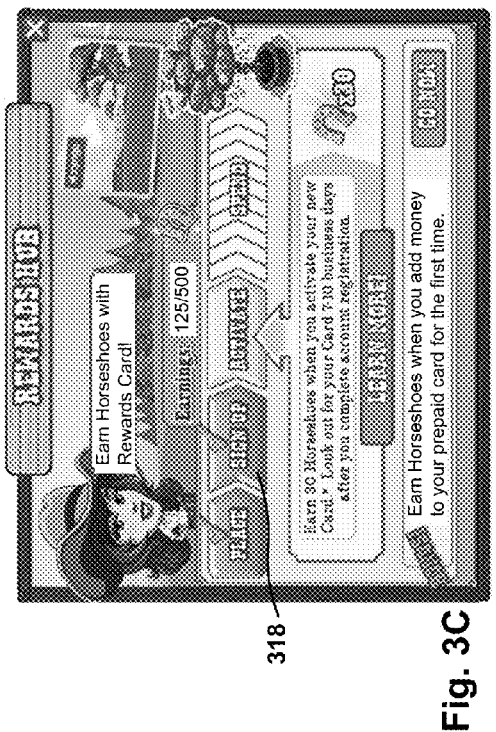

FIG. 3C illustrates the progression map after the player has signed up for the card. Checkmarks in the place and sign-up operations indicate that the user has successfully completed these operations in the progression map. A message encourages the player to activate the card by promising rewards (e.g., 30 horseshoes). In addition, more rewards are promised to the player when the player adds funds to the prepaid card. Once the card is activated and loaded with funds, the prepaid card is ready to be used in the real world. In one embodiment, the more the player uses the prepaid card in the real word, the more rewards are given by the value asset in the game.

It is noted that the player may be able to use the prepaid card in a game related operation, such as using the prepaid card to buy virtual currency. In this case, the player gets rewarded for using the card, similar to when the player uses the prepaid card for any other real-world transaction. In one embodiment, the player gets additional rewards for buying virtual currency in the game with the prepaid card.

In another embodiment, the player may get rewards to be used in the real world for making progress in the game. For example, the player may obtain a free coffee at a coffee house when the player reaches a game goal. The player is notified that the coffee may be acquired for free in the coffee house by using the prepaid card.

After the player activates the card, the fourth stage is reached, and the player gets game rewards every time the player makes a purchase with the prepaid card. In one embodiment, the player only gets a reward for real life purchases a predetermined number of times (e.g., 5, 10, 20, 100, etc.). After using the prepaid card in the real world, when the player returns to the game, there will be an animation or message in the money tree notifying the player to click on the money tree because there is a reward waiting for the player, which is the result of using the prepaid card.

FIG. 3D illustrates an embodiment where the value asset has changed after the player has signed up for the card. Icon 320 associated with the value asset has changed color with reference to the icon initially obtained after placing the value asset (see FIG. 2B). In FIG. 2B, the tree is blue, and in FIG. 3D the tree is green, showing the evolution of the money tree.

In one embodiment, the money tree can be harvested, which is also referred to as tended. In one embodiment, when the player tends or harvests the tree, the player receives game rewards that are unrelated to the game rewards obtained when using the prepaid card.

Figure 3E:
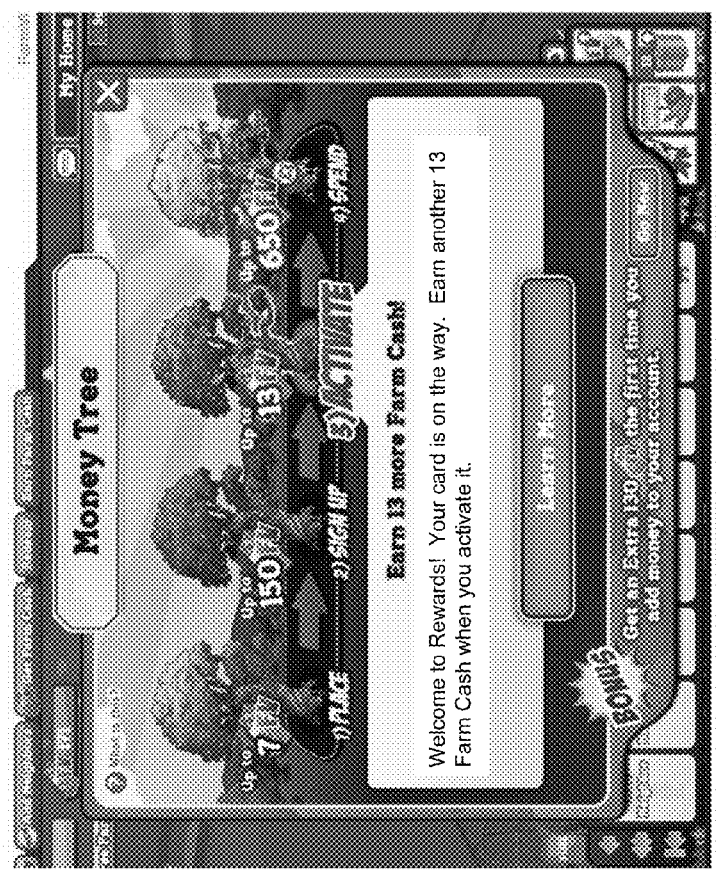

FIG. 3E shows an embodiment of a progression dialogue box after the player has signed up for the prepaid card. In one embodiment, the game informs the player that additional game currency (e.g., 13 Farm Cash) may be obtained by activating the card. In addition, the message box points to the third icon in the value asset evolution, showing the player the new icon to be gained if the player activates the card. Similarly, after activating the prepaid card, a new message would be presented (not shown) notifying the user that additional rewards (e.g., 650 Farm Cash) are available for spending with the prepaid card, as well as a new icon.

Figure 4:
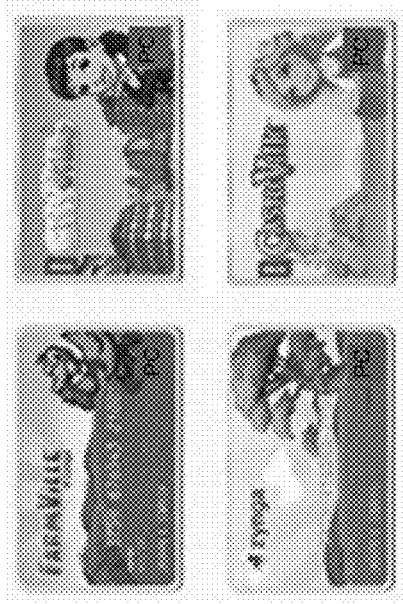
FIG. 4 illustrates several embodiments of prepaid cards associated with the money tree.

FIG. 4 illustrates several embodiments of prepaid cards associated with the money tree. In one embodiment, the player is given the choice to select a prepaid card with a motif associated with the online game. This strengthens the relationship between player and game. In one embodiment, the prepaid card is generically associated with the game developer, and not with a particular game. For example, FIG. 4 illustrates prepaid cards associated with the games FarmVille, CityVille, and CastleVille provided by Zynga Inc., the assignee the of the present application. Another prepaid card is associated with the company Zynga.

In one embodiment, the prepaid card may be associated with Real-Money Gambling (RMG) (e.g., online poker, slots, sports betting, blackjack, craps, and other casino games, etc.). The player may get rewards in the RMG game by using the prepaid card acquired through the RMG game. For example, a poker player may use the RMG card to get poker chips to play in a poker table. As a reward, the player may obtain additional poker chips or other benefits, such as free virtual items for the game, free drinks in a real-life casino, etc. By having the player use a prepaid card associated with the RMG game, a closer relation between the player and the game provider is established.

In one embodiment, an icon in the RMG may be associated with the game. For example, a player with an RMG card may obtain a distinctive status, banner, drink, crown, access to exclusive tables and tournaments, etc.

FIGS. 5A-5C illustrate embodiments for interfaces related to prepaid-card management operations provided outside the game. In one embodiment, the game provides an Internet link for the player in order to sign up for the prepaid card. FIG. 5A illustrates the webpage presented to the player when selecting the Internet link in a web browser. A welcome message reinforces the game rewards (e.g., "Get 150 Free Farm Cash") to be obtained when signing up for the prepaid card (e.g., "Game Rewards Card). In addition, the website lets the user know that additional rewards are available down the road after using the prepaid card 10 times in real-life transactions.

In one embodiment, a Sign Up button 502 is provided to start the signing up process. In another embodiment, a Convert button 504 allows a player that already has a card with the financial provider of the prepaid card to convert the card into a new card associated with the desired game. An icon 506 illustrates one or more of the cards available.

After selecting the sign up option 502, the user is provided another webpage to enter personal information, such as name, address, employment, social security number, etc. Once the personal information is entered, the credit card company creates an account for the player, if approved.

FIG. 5B presents an interface of a login page for a player that already has an account for the prepaid card, according to one embodiment. A welcome message notifies the player some of the operations that need to be completed before the card may be used. For example, the player is reminded that the card needs to be activated, money must be added to the card, and that qualifying purchases may be made to obtain game rewards. A Log In button 508 provides a link for the player to the sign in page.

After the player logs in, a menu is provided (not shown) to perform card-related operations. One of the operations, according to one embodiment, is to add money to the prepaid card. FIG. 5C illustrates an interface for adding money to the prepaid card.

The player may enter the amount to be added to the card (e.g., $20), when to add the money, and the funding source for the funds. The funding source may be any type of financial instrument that allows the card company to get money for the player's card, such as a credit card, debit card, another prepaid card, checking account, savings account, etc. A Submit button 512 is provided to the player for completing the add-money operation.

It is noted that the embodiments illustrated in FIGS. 5A-5C are exemplary. Other embodiments may utilize different layouts, fields, interfaces, etc. The embodiments illustrated in FIGS. 5A-5C should therefore not be interpreted to be exclusive or limiting, but rather exemplary or illustrative.

FIGS. 6A-6B are flow charts illustrating algorithms for executing operations associated with the value asset in the game, according to some embodiments. In some embodiments, when the player logs into the game, a message (e.g., a pop-up message) is presented to the user to invite the user to get the prepaid card.

In some embodiments, the player must meet certain requirements before the offer for the prepaid card is presented. For example, the player must reside in the country (e.g., United States, although other countries are also possible) where the offer is valid. In some embodiments, the offer may be valid in multiple countries. Therefore, when the player logs in one or more checks are performed to determine if the player is eligible.

FIG. 6A is a flowchart of a method for determining if the player is eligible for the card offer, i.e., the player meets the prerequisites for receiving the offer, according to one embodiment. In operation 602, a first check is made to determine if the player is a candidate for the prepaid card. For example, a check is made to determine if the player has a minimum age or meets some other requirements imposed by the game provider or the card provider. If the player does not meet this first requirement, the method continues to operation 610 where the player is determined non-eligible.

If the player is a potential candidate as determined in operation 602, the method flows to operation 604 where another check is performed to determine if the player has reached a minimum level of skill in the game (e.g., the player has reached level 8). If the player does not have the minimum skill level, the player is determined non-eligible in operation 610, and if the player meets the skill requirement the method flows to operation 606.

In operation 606, another check is made to determine if the player is in the geographic area where the prepaid card is available (e.g. a state, a nation, a plurality of nations, a test area, etc.). As with operation 602 and 604, if the player does not meet the geographical requirement, the player is determined non-eligible in operation 610. However, if the player meets the geographic requirement, the method flows to operation 608.

In operation 608, the method checks if the player has already signed up for the prepaid card, and if the player has not signed up for the card, the player is determined eligible for the program in operation 612. After the player is determined eligible, the pop-up message, or some other message, will be presented to the player to inform the player of the availability of the prepaid card program. If the player has already signed up, the player is determined non-eligible in operation 610.

FIG. 6B is a flowchart of a method for providing rewards for the player after placing the money tree. In one embodiment, the game provides a daily reward for a predetermined number of days after placing the money tree in the game. In one embodiment, the player is provided rewards 10 times after the money tree is ripe, but other number may also be possible (e.g., 2-50, etc.). Of course, the player has to "tend" the tree to obtain the rewards, and a minimum amount of time must elapse (e.g., 24 hours) before the tree is ripe again. In one embodiment, the money tree is ripe when first placed, and then becomes ripe every 24 hours.

In one embodiment, the player collects one unit of virtual currency (e.g., 1 horseshoe) every time the tree is tended, up to 10 times. After the 10 times, the player may receive other rewards (e.g., energy, other type of virtual currency, assets for use in the game, etc.), but the player will not receive additional units of the virtual currency (e.g., horseshoes).

In one embodiment, an indicator appears on the tree 634 (e.g., an arrow above the tree), to let the user know that the tree is ripe. In operation 620, the game detects that the player has clicked on the money tree. From operation 620, the method flows to operation 622 where a check is made to determine if the tree is ripe for tending. If the tree is not ripe, the method flows to operation 632, and if the tree is ripe the method flows to operation 624.

In operation 624, "doobers" are added to the game board around the tree to make rewards available, such as experience points (XP), currency, and energy, although other types of assets may also be added as rewards. A "doober" is an icon representing a reward to be collected by the user, and when the user clicks or mouses over the doober, the associated reward is collected and the doober disappears.

From operation 624, the method flows to operation 626 where the game checks how many times the player has tended the ripe tree. If the tree has been tended less than 10 times, the method flows to operation 628, if the tree has been tended exactly 10 times, the method flows to operation 630, and if the tree has been tended more than 10 times the method flows to operation 632.

In operation 622, a doober for one unit of virtual currency (e.g. horseshoe) is added to the game board. In operation 630, one doober is added and a message is presented to the user indicating that this is the final unit of virtual currency obtained by tending the ripe tree, although other types of rewards may be available associated with the tree, as discussed herein.

From operation 630, the method flows to operation 632 where a dialogue or interface is presented to the user, given the ability to the user to perform value asset related operations. It is noted that the embodiments illustrated in FIGS. 6A-6B are exemplary. Other embodiments may utilize different operations, omit some operations, provide different types of rewards, give rewards a different number of times, etc. The embodiments illustrated in FIGS. 6A-6B should therefore not be interpreted to be exclusive or limiting, but rather exemplary or illustrative.

FIGS. 7A-7B are tables illustrating the rewards associated with the money tree, according to some embodiments. FIG. 7A illustrates the rewards available in the form of virtual currency (e.g., horseshoes). The table specifies which incentive (i.e., reward) is available based on the action associated with the token. For example, when the player places the money tree in the board and proceeds to harvest the money tree, the player gets 1 horseshoe, up to a maximum of 10 times (column titled "#Claims"). The rightmost column indicates the total number of horseshoes that may be collected by each action on the leftmost column.

When the player registers for the prepaid card, the player gets 300 horseshoes as a reward, and the rewards associated with the registration may only be collected once. Further, after the player adds money to the prepaid card for the first time, the player gets 200 horseshoes. Additionally, the first 10 times that the player makes a purchase with the prepaid card, the player gets 100 horseshoes each time, for a total maximum of 1000 horseshoes.

FIG. 7B describes the rewards that may be obtained by tending the money tree, other than the rewards in the form of virtual currency described in FIG. 7A. When the player places the money tree, the player gets 50 experience points (XP), one hundred coins (i.e., second virtual currency different from the virtual currency of FIG. 7A), and a snack for 5 energy points.

When the player registers the card, the player gets 250 experience points, 200 coins, and a breakfast for 10 energy points. When the player activates the card, the player gets 450 experience points, 500 coins, and a lunch for 15 energy points, and when the player makes the first purchase with the prepaid card, the player gets 750 experience points, 800 coins, and dinner for 30 energy points.

It is noted that the embodiments illustrated in FIGS. 7A-7B are exemplary. Other embodiments may utilize different types of rewards, different amounts of rewards, rewards given for other value-asset-related activities, etc. The embodiments illustrated in FIGS. 7A-7B should therefore not be interpreted to be exclusive or limiting, but rather exemplary or illustrative.

Figure 8:
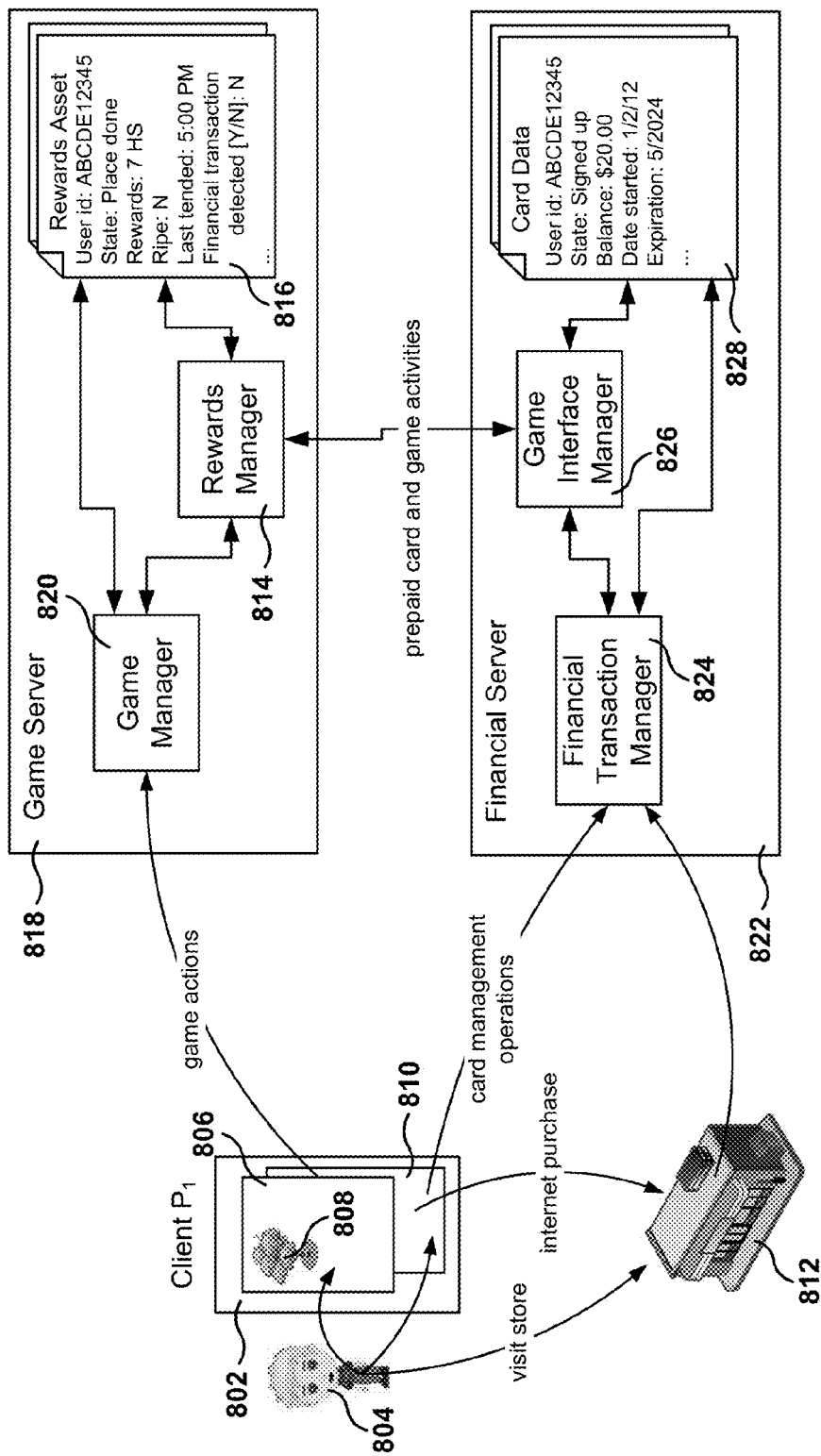
FIG. 8 is an exemplary architecture of a computer system for implementing embodiments presented herein.

FIG. 8 is an exemplary architecture of a computer system for implementing embodiments presented herein. In one embodiment, the online game is hosted by server 818, which includes a game manager 820, and a rewards manager 814. A first player P1 804 plays the game utilizing client device 802 executing a game computer program 806. In one embodiment, the computer program 806 is a web browser, and in another embodiment other computer programs may also be utilized to play the game, such as a computer program loaded on a computing device for the exclusive purpose of playing the game. Client device 802 further includes a web browser 810, which may be used to perform game operations, to gain access to the interface for performing prepaid card related operations with financial server 822, or to perform financial operations (e.g., Internet purchases) with the prepaid card. In one embodiment, the first player P1 804 has placed a value asset 808 in the game 806.

The game 806 interfaces with game server 818 to perform game operations, including game operations related to value assets. The rewards manager 822 provides card-activity information to game manager 820 (e.g., player signs up for the card, player makes a purchase with the card, etc.). The rewards manager 814 interfaces with the game interface manager 826 in financial server 822 to exchange information related to the value asset of the game and financial transactions performed with the card associated with the value asset. For example, when the player activates the prepaid card with financial server 822, the game interface manager sends information to the rewards manager 814 to let the game operator know that the card has been activated. The interface between rewards manager 814 and 826 is provided to support all the operations described herein for interfacing the game provider with the financial institution offering the prepaid card.

In one embodiment, after the player installs the value asset in the game, the game places an icon associated with the value asset in a game board, and sends an electronic message to game interface manager 826, to notify the commercial company that the player has assigned or installed the value asset.

In one embodiment, the financial server 822 detects the user 804 has performed a commercial operation using the prepaid card (e.g., the user makes and in-store purchase in a store 812, or performs an Internet purchase with the prepaid card, or signs up for the card) when the financial transaction manager 824 receives an electronic message from a commercial company. In response, the game interface manager 826 notifies the rewards manager 814 that the financial transaction has taken place. In one embodiment, the commercial operation is selected from a group consisting of signing up for a prepaid card, activating the prepaid card, adding money to the prepaid card, or spending money with the prepaid card.

Database 816 in game server 818 is used to store information related to value assets. In one embodiment, database 816 includes a list of value assets owned by each player (e.g., player 804), and for each value asset associated information is stored. A list of attributes and parameters is associated with each value asset. In one embodiment, the list of attributes includes one or more of a user ID, a state of the value asset (e.g., placed, signed, activated, etc.), rewards given to the player, rewards available to the player, whether the money tree is ripe, the time when the tree was last tended, whether there is a financial transaction pending that needs attention, etc.

Financial server 822 further includes a card-data database 828, which includes information related to the prepaid cards owned by players. In one embodiment, card-data database 828 includes one or more of a user ID, a state of the prepaid card, a balance on the prepaid card, a registration date for the card, an expiration date for the card, etc.

It is noted that the embodiments illustrated in FIG. 8 are exemplary. Other embodiments may utilize different modules, computer programs, interfaces, interactions, value asset implementations, database structures, etc. For example, in one embodiment, value assets are kept in a separate list from the regular assets. The embodiments illustrated in FIG. 8 should therefore not be interpreted to be exclusive or limiting, but rather exemplary or illustrative.

Figure 9:
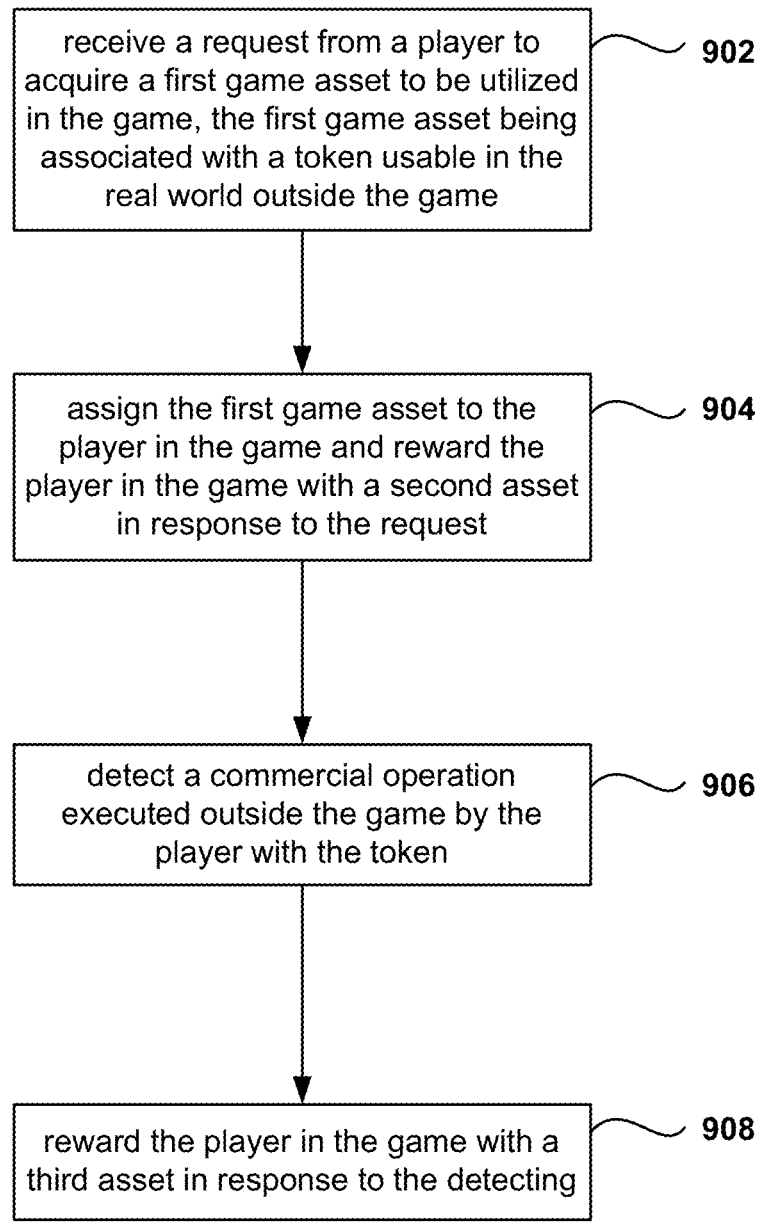
FIG. 9 is a flowchart illustrating an algorithm for executing game operations, in accordance with one embodiment.

FIG. 9 is a flowchart illustrating an algorithm for executing game operations, in accordance with one embodiment. In operation 902, a request is received from a player to acquire a first game asset to be utilized in the game. The first game asset is associated with a token usable in the real world outside the game. In one embodiment, the token is one of a prepaid card, a credit card, an automated teller machine (ATM) card, a store card, a membership card, a gift card, etc.

From operation 902, the method flows to operation 904, where the first game asset is assigned to the player in the game in response to the request. Additionally, the player is rewarded in the game with a second asset.

From operation 904, the method flows to operation 906, where a commercial operation, executed outside the game by the player with the token, is detected. In one embodiment, the commercial operation is one of signing up for a prepaid card, activating the prepaid card, adding money to the prepaid card, or spending money with the prepaid card.

From operation 906, the method flows to operation 908, where the player is rewarded in the game with a third asset in response to the detecting. In one embodiment, operations of the method are executed by a processor.

In another embodiment, a method includes operations for receiving a request from a player to acquire a first game asset to be utilized in the game, the first game asset being associated with a token usable in a real world outside the game, where the first asset includes growth stages associated with a plurality of commercial operations executed in the real world with the token; assigning the first game asset to the player in the game; sending an electronic message to notify a commercial company that the player has assigned the first game asset; detecting a first commercial operation executed outside the game by the player with the token; evolving the first asset from a first growth stage to a second stage in response to detecting the first commercial operation; and rewarding the player in the game with a second asset in response to the evolving. In one embodiment, a different in-game icon for the first game asset is associated with each of the growth stages.

In another embodiment, operations of the method are performed by a computer program when executed by one or more processors, the computer program being embedded in a non-transitory computer-readable storage medium.

Figure 10:
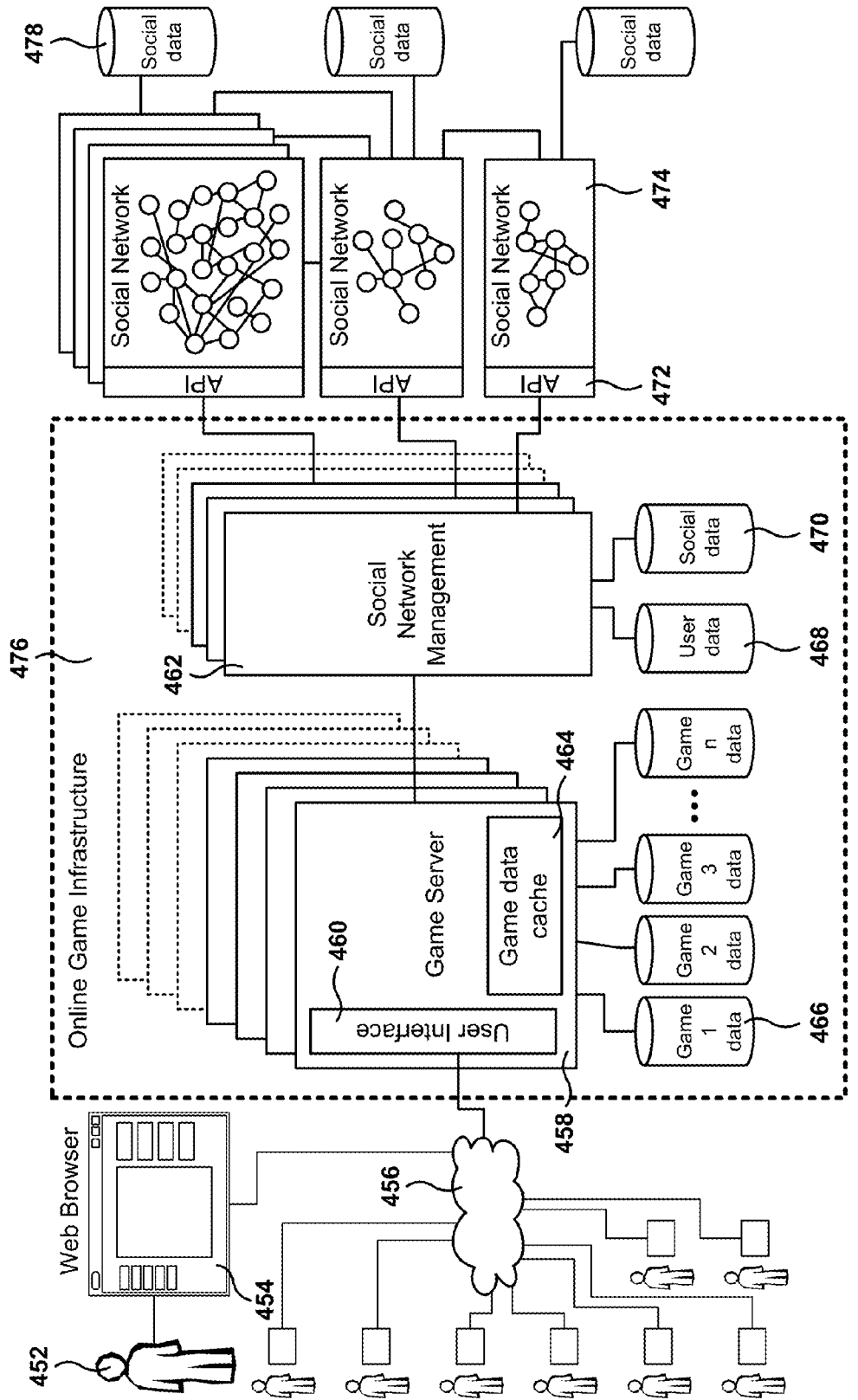
FIG. 10 illustrates an implementation of a Massively Multiplayer Online (MMO) infrastructure, according to one embodiment.

FIG. 10 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 10 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 10 should therefore not be interpreted to be exclusive or limiting, but rather exemplary or illustrative.

Figure 11:
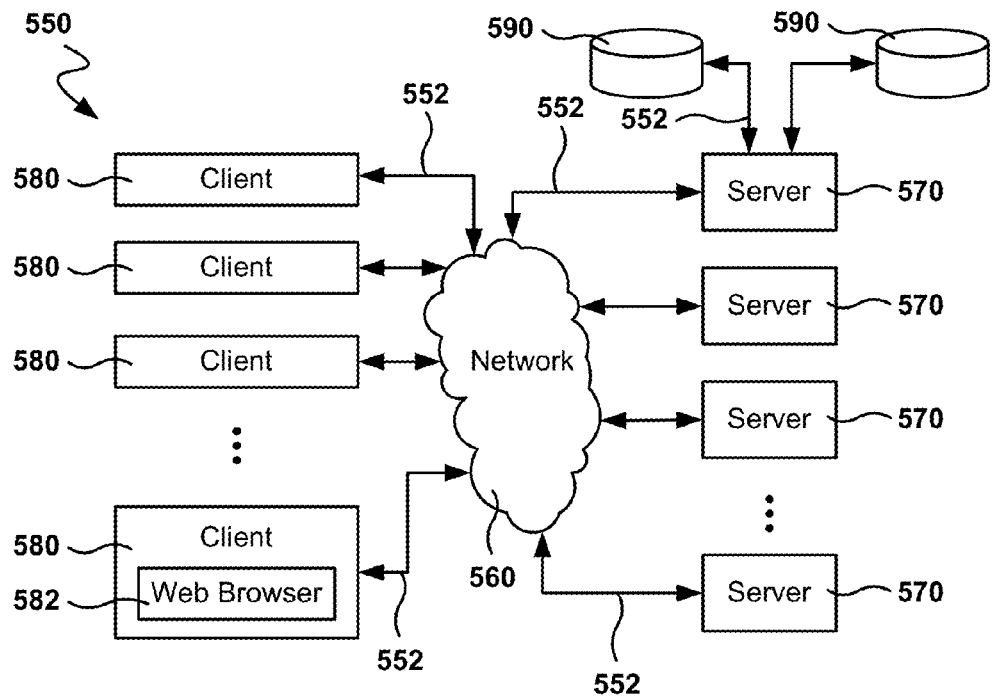
FIG. 11 illustrates an example network environment suitable for implementing embodiments.

FIG. 11 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, community server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 12:
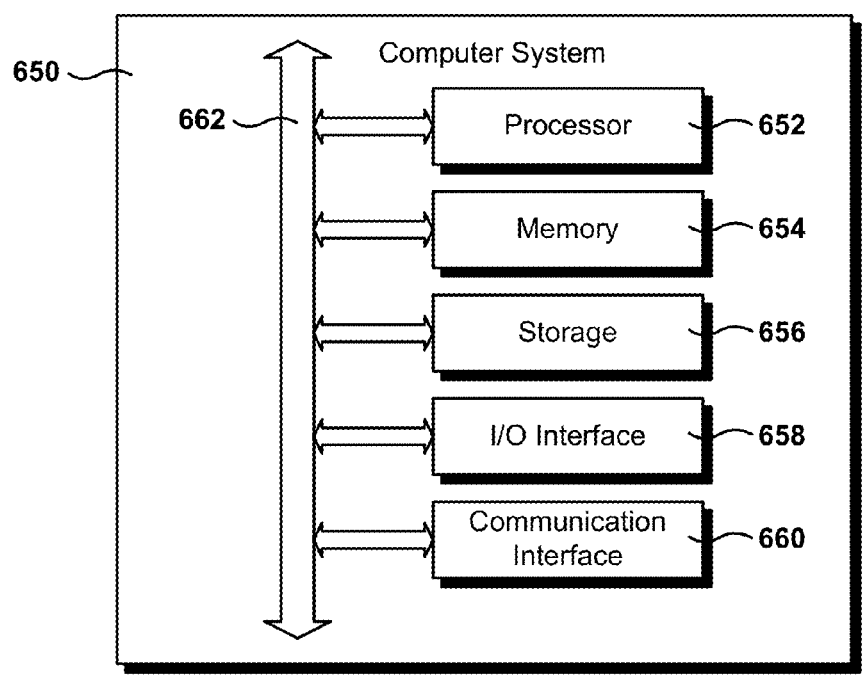
FIG. 12 illustrates an example computer system for implementing embodiments.

FIG. 12 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method for executing game operations, the method comprising:
receiving, by a game server having a processor executing a game, a request from a player to acquire a first game asset to be utilized in the game;
instructing, by the game server in response to receiving the request, the player to obtain outside the game and in a real world a credit card from a commercial company and to use the credit card in the real world;
sending from the game server a first electronic message to a financial server of the commercial company with information about the player request, wherein the financial server is operable to notify the game server when the player obtains the credit card;
assigning the first game asset to the player in the game in response to the request;
receiving by the game server a second electronic message from the financial server of the commercial company indicating that the player obtained the credit card from the commercial company;
rewarding the player in the game with a second game asset in response to the receiving the second electronic message; and
presenting growth stages for the first game asset, wherein an icon for presenting the first game asset in the game is changed after completing a respective credit card operation with the credit card for each growth stage, wherein the credit card operations for each growth stage include placing the first game asset, applying for the credit card, activating the credit card, and making a purchase with the credit card, wherein operations of the method are executed by the processor.

2. The method as recited in claim 1, further including:
providing additional rewards to the player after completing the credit card operation for each of the growth stages.

3. The method as recited in claim 2, wherein assigning the first game asset further includes:
placing a first icon associated with the first game asset in a game board.

4. The method as recited in claim 3, further including:
placing new icons for the first game asset in the game board after reaching each of the growth stages.

5. The method as recited in claim 1, further including:
determining if the player meets prerequisites to obtain the first game asset; and
notifying the player in the game that the player is eligible to obtain the game asset.

6. The method as recited in claim 5, wherein the prerequisites includes one or more of a minimum age, a minimum level achieved by the player in the game, or a geographic location of the player.

7. The method as recited in claim 1, wherein using the credit card is selected from a group consisting of activating the credit card, adding money to a balance on the credit card, or making a purchase with the credit card.

8. The method as recited in claim 1, wherein the first game asset is selected from a group consisting of a tree, a plant, a vehicle, a car, an airplane, a ship, a weapon, a gun, a rifle, a building, a castle, a decoration, a fountain, or an avatar, wherein the second asset is selected from a group consisting of a game currency, game energy, or a food item.

9. The method as recited in claim 1, further including:
providing a daily reward for a predetermined number of days after assigning the first game asset to the player in the game.

10. The method as recited in claim 1, wherein the credit card is a prepaid card or a card for making purchases with credit.

11. The method as recited in claim 1, further including:
receiving by the game server a third electronic message from the financial server indicating that the player activated the credit card; and
rewarding the player in the game in response to receiving the third electronic message.

12. The method as recited in claim 1, further including:
receiving by the game server a fourth electronic message from the financial server indicating that the player made a purchase with the credit card; and
rewarding the player in the game in response to receiving the fourth electronic message.

13. A method for executing game operations, the method comprising:
receiving, by a game server having a processor executing a game, a request from a player to acquire a first game asset to be utilized in the game;
instructing, by the game server in response to receiving the request, the player to obtain outside the game and in a real world a credit card from a commercial company and to use the credit card in the real world, wherein the first game asset includes growth stages associated with a plurality of commercial operations executed in the real world with the credit card, each growth stage being associated with a completion of a credit card operation performed in the real world, wherein the growth stages include placing the first game asset, signing up to the credit card, activating the credit card, and making a purchase with the credit card;
assigning the first game asset to the player in the game;
sending from the game server a first electronic message to a financial server of a commercial company issuing the credit card that the first game asset has been assigned to the player, wherein the financial server is operable to notify the game server when the player obtains the credit card;
receiving by the game server a second electronic message from the commercial company, the second electronic message indicating that the credit card was obtained by the player;
evolving the first game asset from a first growth stage to a second stage in response to receiving the second electronic message; and
rewarding the player in the game with a second game asset in response to the evolving, wherein operations of the method are executed by the processor.

14. The method as recited in claim 13, further including:
associating a different in-game icon for the first game asset for each of the growth stages.

15. The method as recited in claim 13, wherein the credit card is a prepaid card or a card for making purchases with credit.

16. The method as recited in claim 13, wherein operations of the method are performed by a computer program when executed by one or more processors, the computer program being embedded in a non-transitory computer-readable storage medium.

17. A computer program embedded in a non-transitory computer-readable storage medium, when executed by one or more processors, for executing game operations, the computer program comprising:
program instructions for receiving, by a game server having a processor executing a game, a request from a player to acquire a first game asset to be utilized in the game;
program instructions for instructing, by the game server in response to receiving the request, the player to obtain outside the game and in a real world a credit card from a commercial company and to use the credit card in the real world;
program instructions for sending from the game server a first electronic message to a financial server of the commercial company with information about the player request, wherein the financial server is operable to notify the game server when the player obtains the credit card;
program instructions for assigning the first game asset to the player in the game in response to the request;
program instructions for receiving by the game server a second electronic message from the financial server of the commercial company indicating that the player obtained the credit card from the commercial company;
program instructions for rewarding the player in the game with a second game asset in response to the receiving the second electronic message; and
program instructions for presenting growth stages for the first game asset, wherein an icon for presenting the first game asset in the game is changed after completing a respective credit card operation with the credit card for each growth stage, wherein the credit card operations for each growth stage include placing the first game asset, applying for the credit card, activating the credit card, and making a purchase with the credit card.

18. The computer program as recited in claim 17, wherein using the credit card in the real world is an operation selected from a group consisting of performing a purchase with the credit card, placing a bet with the credit card, or withdrawing money from an ATM with the credit card.

19. The computer program as recited in claim 17, wherein the first game asset is selected from a group consisting of a tree, a plant, a vehicle, a car, an airplane, a ship, a weapon, a gun, a rifle, a building, a castle, a decoration, a fountain, or an avatar.

* * * * *